No. 753,415. Patented March 1, 1904.

UNITED STATES PATENT OFFICE.

WILLIAM H. MACK, OF MESSMORE, PENNSYLVANIA.

NUT-LOCK.

SPECIFICATION forming part of Letters Patent No. 753,415, dated March 1, 1904.

Application filed January 18, 1902. Serial No. 90,362. (No model.)

*To all whom it may concern:*

Be it known that I, WILLIAM H. MACK, a citizen of the United States, residing at Messmore, in the county of Fayette and State of Pennsylvania, have invented a new and useful Improvement in Nut-Locks, of which improvement the following is a specification.

This invention relates to certain new and useful improvements in nut-locks, and has for its object the provision of novel means whereby a nut will be prevented from turning upon a bolt and will be securely locked thereto.

The invention has for its further object to provide a nut-lock that will be extremely simple, strong, durable, comparatively inexpensive to manufacture, and highly efficient in its use.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1:
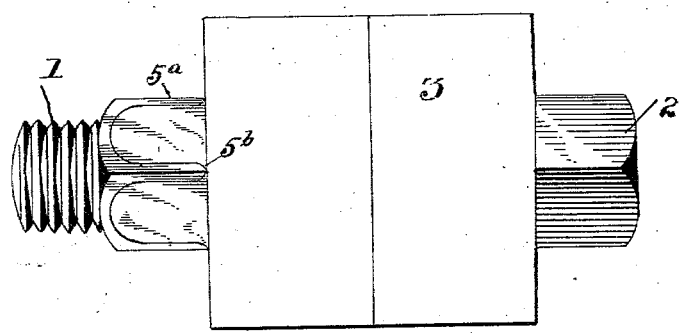
Figure 2:
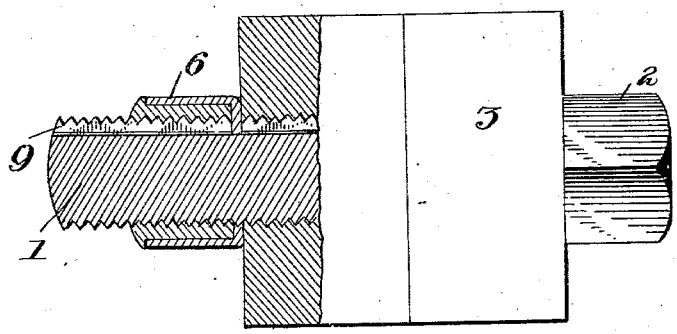
Figure 3:
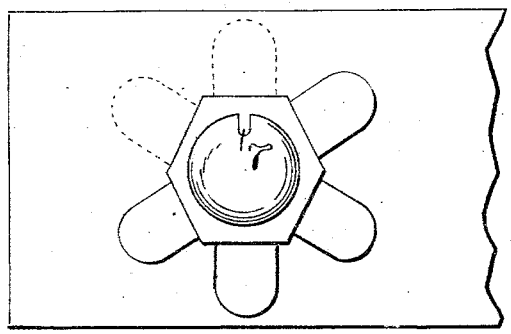
Figure 4:
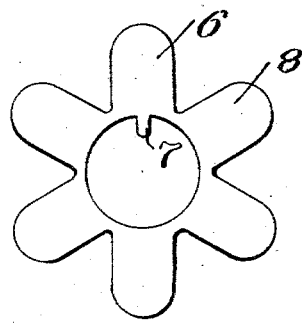
Figure 5:
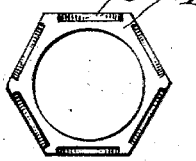

Figure 1 is a side elevation of a nut and bolt applied in position with my improvements attached thereto. Fig. 2 is a vertical sectional view thereof, partly broken away. Fig. 3 is a plan view showing two of the ears in dotted lines. Fig. 4 is a plan view of the washer. Fig. 5 is a rear elevation of the nut.

In the drawings the reference-numeral 1 indicates the threaded bolt, and 2 the head thereof.

3 represents the piece of timber or other material to which the improvements are applied.

4 represents the nut, having a recess 5 formed therein, and 6 represents a washer having an inwardly-extending shoulder 7 and outwardly-extending ears 8. The reference-numeral 9 represents a groove formed in the bolt, in which the shoulder 7 rides and extends. The walls or ribs $5^a$, which separate the recesses 5, have their inner ends tapered from their opposite sides, as at $5^b$, whereby wedging action is produced at the juncture of the ears 8.

The operation of my improved nut-lock is as follows: The bolt being placed in position, the washer is secured thereon, the shoulder 7 engaging in the groove 9, and the nut then is applied thereto. When driven home, the ears 8 are bent over and engage the recess 5, thereby locking the nut and securely retaining the same, preventing the turning of the nut upon the bolt. When it is desired to release the nut, the ears are bent upwardly, and the nut may then be easily disengaged from the bolt in the usual manner.

The many advantages obtained by the use of my improved nut-lock will be readily apparent from the foregoing description taken in connection with the accompanying drawings.

It will be noted that various changes may be made in the details of construction without departing from the general spirit of my invention.

Having fully described my invention, what I claim as new, and desire to secure by Letters Patent, is—

The combination with the bolt formed with a longitudinal groove, and a nut mounted on said bolt and being formed in its periphery with grooves extending inwardly from its inner edge, said grooves having their inner ends curved to approximately semicircular contour, the walls or ribs separating said grooves having their inner ends tapered from their opposite sides, and a washer having a central opening adapted to receive said bolt, a lug formed integral with said washer and projecting inwardly into the opening thereof and engaging a groove in said bolt, and a plurality of radially-disposed ears bent at right angles to said lug and being received in the grooves of said nut, the tapered ends of the walls of said grooves engaging the said ears at their inner ends, substantially as and for the purpose specified.

In testimony whereof I have hereunto signed my name in the presence of two subscribing witnesses.

WILLIAM H. MACK.

In presence of—
 A. H. RIPPLE,
 U. W. COFFMAN.